Oct. 4, 1932.  A. H. BOILEAU  1,880,731
BATCH FREEZER MECHANISM
Filed Nov. 1, 1930   2 Sheets-Sheet 2

Patented Oct. 4, 1932

1,880,731

UNITED STATES PATENT OFFICE

ARTHUR H. BOILEAU, OF CEDAR RAPIDS, IOWA, ASSIGNOR TO CHERRY-BURRELL CORPORATION, OF CEDAR RAPIDS, IOWA, A CORPORATION OF DELAWARE

BATCH FREEZER MECHANISM

Application filed November 1, 1930. Serial No. 492,641.

This invention relates to certain novel improvements in batch freezer mechanisms of the character employed in the manufacture of ice cream and the like, and especially to the horizontal type.

The principal objects of the invention are to provide a novel batch freezer mechanism wherein the batch my be mixed during freezing and aerated or whipped after the freezing operation has been carried out for a predetermined period; wherein agitating mechanisms will be provided which may be moved as a unit and which may also be moved as a unit with portions thereof moved additionally to the unit movement; wherein the mixing or agitating mechanisms will include dashers or whipping members arranged inwardly of other dashers or agitating members; wherein the whipping members will create a folding action and will be disposed in definite angular relationship to each other; wherein a driving mechanism for the dashers will be provided that may be selectively operated to move all of the dashers as a unit or to selectively operate certain of the dashers additionally to the unit movement; and wherein a simple arrangement will be provided for controlling the selective operation.

Figure 1:
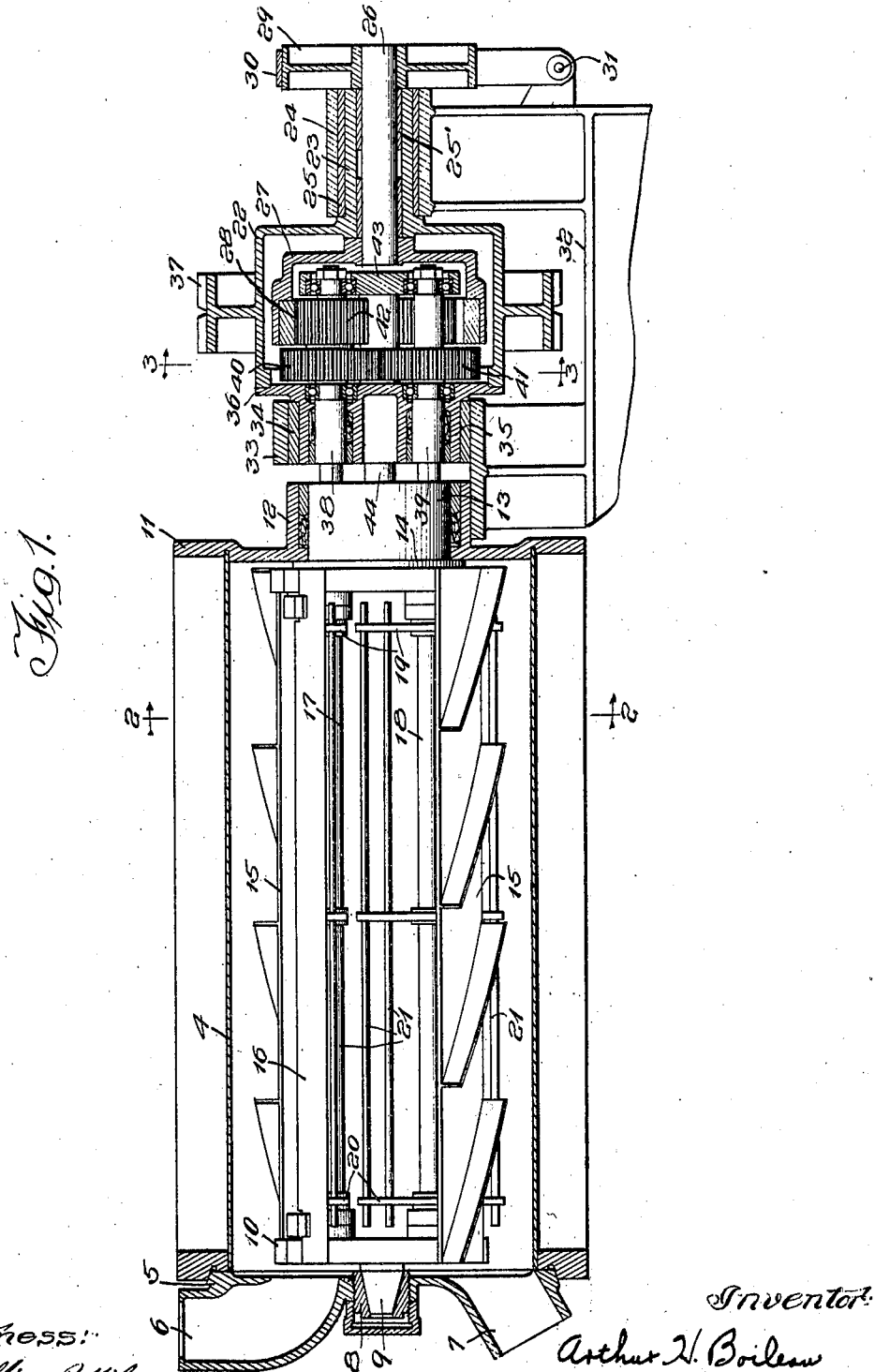
Figure 2:
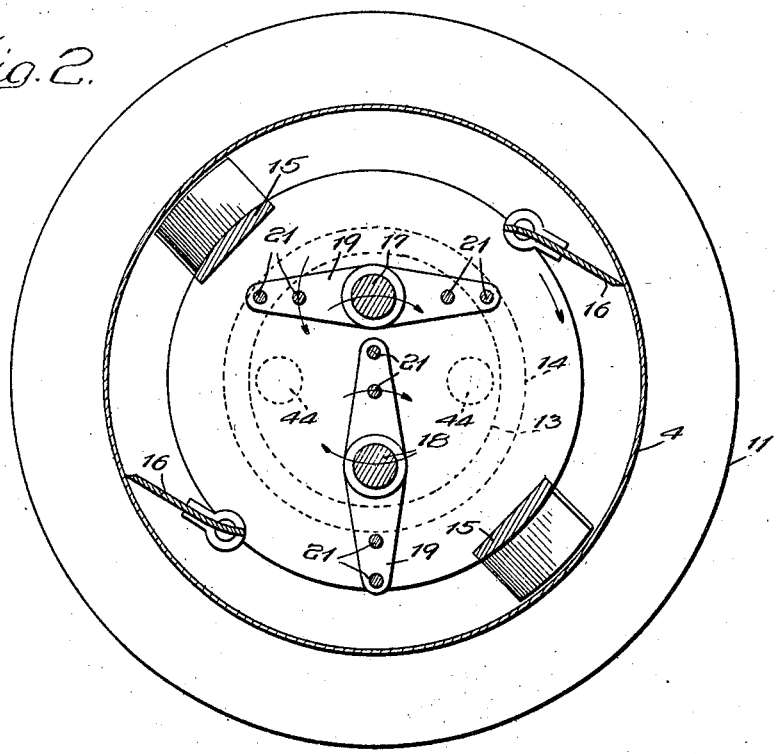
Figure 3:
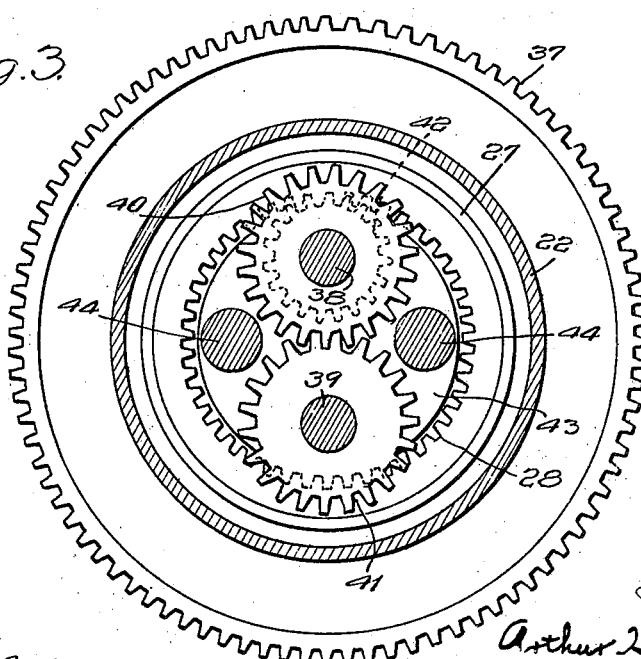

A selected embodiment of the invention is illustrated in the accompanying drawings wherein Fig. 1 is a longitudinal sectional view of a selected embodiment of my invention;

Fig. 2 is a transverse sectional view taken substantially on the line 2—2 on Fig. 1; and Fig. 3 is a transverse sectional view taken substantially on the line 3—3 on Fig. 1.

The invention, as illustrated in the accompanying drawings, includes a tubular housing 4 having an end wall 5 at one end thereof including the usual inlet passage 6 and the usual outlet passage 7, said passages being connected to the usual mechanisms which form no part of this invention and which are therefore not illustrated. In the end wall 5 there is a bearing structure 8 in which the stud bearing 9 on the end spider 10 is mounted. At the end of the housing 4 opposite the end wall 5 there is an end wall 11 having a neck portion 12, and a bearing portion 13 on the dasher spider 14 is journaled in this neck portion. The spiders 10 and 14 provide the end portions of the dasher. The dasher consists of an outer dasher or agitator and an inner dasher or whipper, and the spiders 10 and 14 are a part of the outer dasher. Extended between the spiders and constituting a part of the agitator are the unloading wings 15 (Fig. 2), and circumferentially spaced from the unloading wings 15 are the scraper blades 16 which also constitute a part of the agitator. The whipper includes shafts 17 and 18, at opposite ends of which arms 19, 19 and 20, 20 are arranged. Extending between the arms at opposite ends of the shafts 17 and 18 are rods 21 and, in the present instance, two such rods are provided at the ends of each of the arms, although the invention is not limited necessarily to such a number of rods. The shafts 17 and 18 are journaled in the spiders 10 and 14, and therefore when the spiders are rotated these shafts will rotate, and the parts carried thereby will also rotate, as a unit with the outer dasher. In a manner to be described hereinafter a movement, additional to the foregoing movement, may be imparted to the shafts 17 and 18 and the whipping members carried thereby, and these whipping members are caused to rotate oppositely to each other. Moreover, the whipping members are so disposed that the orbits defined by the rotation thereof intersect and the whipping members are disposed in angular relation with each other, this angular relation preferably being 90° and in this manner interference of the whipping members is prevented although the material moved thereby through the orbits of rotation thereof will intermix or fold and thus the air pocket defined therebetween may be said to be folded between the orbits and in this manner the material is thoroughly whipped or aerated. In one manner of operation of the device the dasher will be operated as a unit during the freezing of a batch and after the freezing has been carried out for a predetermined period the inner dashers or whippers will be operated additionally to the unit movement to augment the whipping action. It is to be understood however, that the whipping members may be kept in operation during both the freezing and whipping operations without materially effecting the product. I have however found that it is advantageous to interrupt the additional movement of the whippers during the unloading operation but here again this interruption need not be brought about, for satisfactory unloading may be attained by operating the whippers additionally to the unit movement even during the unloading operation.

In order to drive the dasher structure both as a unit and to impart the independent rotative movement to the shafts 17 and 18 a drive mechanism is provided which includes the substantially cup-shaped member 22 having a neck 23 extending therefrom. A bearing 24 is provided which has a sleeve 25 therein, said sleeve being arranged intermediate the bearing and the neck 23 and serves to rotatively support the neck in the bearing. Arranged in the bore in the neck 23 is a bearing sleeve 25' in which the shaft 26 is journaled, said shaft 26 carrying at the inner end thereof interiorly of the cup-shaped member 22, a spider 27 having an internal gear 28 thereon. Mounted on the outer end of the shaft 26 is a wheel 29, the periphery of which is embraced by a friction band 30, one end of which is secured at 31 to a lug on the supporting frame 32, said frame also supporting the bearing 24, and the opposite end of the friction band 30 is connected to a suitable mechanism for tightening the band in engagement with the periphery of the wheel 29. A bearing 33 is provided by the frame 32 and has a bearing sleeve 34 therein, in which the neck portion 35 on the plate 36 is journaled. The plate 36 closes the open end of the cup-shaped member 22 and is suitably connected thereto. Mounted on the periphery of the cup-shaped member 22 is a sprocket 37 adapted to be engaged by a silent drive chain (not shown) which may be connected to a suitable source of power. Journaled in the neck portion 35 of the plate 36 are two shafts 38 and 39 which extend through the plate 36 and which have mounted thereon meshing spur gears 40 and 41. The shaft 38 also carries a pinion 42 which meshes with the internal gear 28. The free ends of the shafts 38 and 39 are journaled in anti-friction bearings provided in the plate 43 arranged adjacent these free ends, this arrangement imparting rigidity to the structure. Fixed in the neck portion 35 are studs 44 which are connected to the spider 14, and the shafts 38 and 39 are suitably connected to the shafts 17 and 18. When power is supplied to the sprocket 37 the cup-shaped member 22 is rotated and the plate 36 rotates therewith. This movement is transmitted through the studs 44 to the spider 14, and therefore the dasher is rotated as a unit. At this time the friction band 30 will be out of engagement with the wheel 29. However, when the band is tightened and brought into frictional engagement with said wheel, rotation of the wheel is retarded which will retard rotation of the shaft 26. Previously, the shaft 26 will have been rotating with the cup-shaped member 22 by reason of the connection established through the pinion 42 and internal gear 28 to the spider 27. However, when rotation of the shaft 26 is retarded, the spider 27 will be held against movement by the cup-shaped member 22 and the plate 36 will continue to rotate. As the internal gear 28 is supported by the spider 27 and as this gear will be held stationary, it is manifest that movement of the pinion 42 around this gear, by reason of the movement of said pinion with the plate 36, will cause rotation of the pinion and therefore of the shaft 38. This rotation will be transmitted to the shaft 39 through the spur gears 40 and 41, and it is manifest that the shaft 39 will rotate in a direction opposite to the direction of rotation of the shaft 38 and therefore the shaft 17 will rotate oppositely to the shaft 18. The inner dashers carried by these shafts 17 and 18 are arranged in definite angular relation to each other as, for example, at right angles, as clearly illustrated in Fig. 2. Therefore, the inner dashers will operate to thoroughly agitate the batch and will not interfere with each other, and by reason of the opposite rotation very effective agitation will be produced.

From the foregoing description it is manifest that I have provided a batch freezer mechanism wherein the dasher may be operated as a unit or wherein portions of the dasher may be operated independently of the unit operation thereof. It is also apparent that the control for such dual operation is arranged extraneously of the driving mechanism and may therefore be readily operated. Furthermore, by reason of the intersecting of the orbits of the whipping members, a very effective whipping operation may be brought about and thus thorough aeration will result. In addition to the foregoing, the driving mechanism is arranged in a compact manner for positive operation.

In the foregoing description I have set forth a selected embodiment of my invention, but this is capable of change and modification and I therefore do not wish to be limited to the precise details set forth but desire to avail myself of such changes and modifications as fall within the purview of the following claims:

I claim:

1. In a batch freezer mechanism, a freezer housing, a dasher in said housing and comprising fixed and movable dasher members, a driving means disposed out of said housing and connected to said dasher, and means in said driving means for controlling the operation of said driving means whereby said dasher may be operated as a unit or with the movable dasher members operating additionally to the unit movement.

2. In a batch freezer mechanism, a freezer housing, a dasher in said housing and comprising inner dasher members and outer dasher members, driving means disposed out of said housing and including a driving member, a driven member, means for operating said driving member to move said dasher as a unit, and means in said driving means for optionally operating said inner dasher members from said driven member additionally to the unit movement of said dasher.

3. In a batch freezer mechanism, a freezer housing, a dasher in said housing and comprising fixed and movable dasher members, driving means disposed out of said housing and including a driving member, a driven member, means for operating said driving member to move said dasher as a unit, means for holding said driven member against movement, and means connected to said driven member for operating the movable dasher members additionally to said unit movement when said driven member is held against movement.

4. A horizontal type batch freezer mechanism comprising a freezer housing, a dasher member in said housing and embodying agitating members and whipping members, driving means for driving both said agitating members and whipping members as a unit and disposed out of said housing, and means in said driving means for driving said whipping members in opposite directions to each other additionally to said unit movement.

5. A batch freezer mechanism comprising a freezer housing, a dasher in said housing and including spiders at the ends thereof and having inner dasher members and outer dasher members arranged between said spiders, a driving means disposed out of said housing, means connecting one of said spiders to said driving means whereby said dasher is operated as a unit from said driving means, and means in said driving means for optionally operating the inner dasher members additionally to said unit movement.

6. A batch freezer mechanism comprising a freezer housing, a dasher in said housing and including spiders at the ends thereof and having inner dasher members and outer dasher members arranged between said spiders, a driving means disposed out of said housing, means connecting one of said spiders to said driving means whereby said dasher is operated as a unit from said driving means, shafts connected to said inner dasher members, a member in said driving means and movable therewith, means connecting said shafts to said member, and means for holding said member against movement whereby said inner dasher members are operated additionally to the unit movement of said dasher when said member is held against movement.

7. A batch freezer mechanism including a housing having a dasher therein comprising fixed and movable dasher members, said movable dasher members being movable relative to said dasher and being disposed in definite angular relation with respect to each other, driving means disposed out of said housing and operable to rotate said dasher as a unit, and means in said driving means for rotating said movable dasher members additionally to the unit movement.

8. In a batch freezer mechanism, a freezer housing, a dasher in said housing and comprising fixed and movable dasher members, and driving means disposed out of said housing and including a driving member, a driven member in said driving member and including a part extending from said driving member, means for holding said part against rotation with said driving member whereby said driven member may be held against rotation, means connecting said dasher to said driving member for rotation therewith, and means connecting said movable dasher members to said driven member whereby said movable dasher members will be operated relative to each other and said fixed dasher members when said part is held against rotation.

9. In a batch freezer mechanism which has a driving means including a driving member, a driven member in said driving member and including a part extending from said driving member, and means for holding said part against rotation with said driving member whereby said driven member may be held against rotation, the combination therewith of a freezer housing spaced from said driving means, a dasher in said housing and having agitating members and whipping members, means connecting said dasher to said driving means whereby said dasher is rotated to move said agitating members and whipping members as a unit, and means connecting said whipping members to said driven member whereby said whipping members are rotated relative to each other and to said agitating members when said part is held against rotation, said whipping members being arranged substantially at right angles to each other and being rotatable in opposite directions and disposed in relation to each other so that the orbits of rotation thereof intersect whereby material moved thereby is folded upon itself when said whipping members are rotated relative to each other and said agitating members.

10. A batch freezer mechanism comprising a housing having a bearing at one end thereof, a dasher in said housing and including spiders at the ends thereof and having inner dasher members and outer dasher members arranged between said spiders, a driving means disposed out of said housing, a bearing member on one of said spiders and journaled in said housing, means rotatably supporting the other of said spiders from the other end of said housing, means connecting said bearing member to said driving means whereby said dasher is operated as a unit from said driving means, shafts connected to said inner dasher members and extended through said bearing member, a member in said driving means and movable therewith, means connecting said shafts to said member, and means for holding said member against movement whereby said inner dasher members are operated additionally to the unit movement of said dasher when said member is held against movement.

ARTHUR H. BOILEAU.